June 25, 1946.                J. R. WOOD                 2,402,796
                  PIPE CLEANER AND DENT STRAIGHTENER
                        Filed May 25, 1943
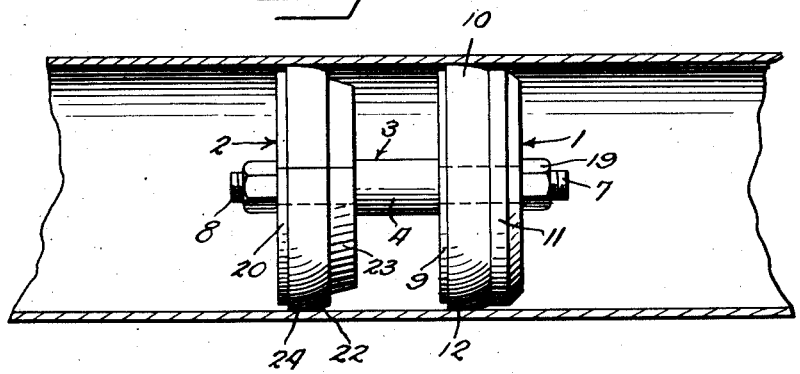
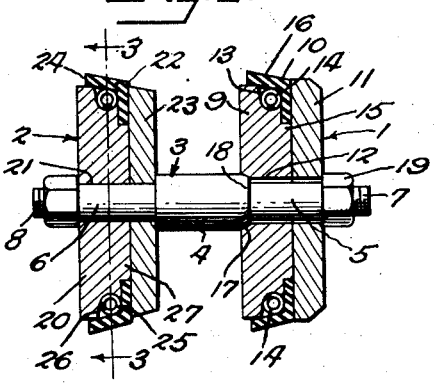
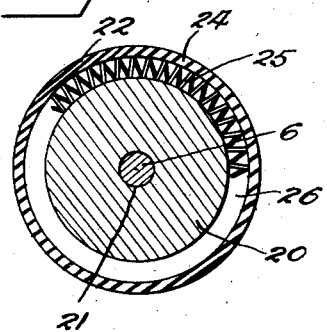
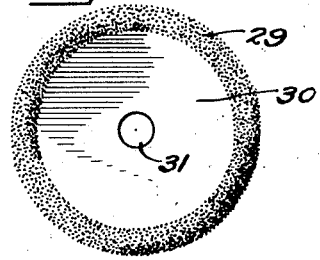
Inventor
J. R. Wood Patented June 25, 1946

2,402,796

UNITED STATES PATENT OFFICE 2,402,796

PIPE CLEANER AND DENT STRAIGHTENER

Joseph R. Wood, Portsmouth, Va.

Application May 25, 1943, Serial No. 488,419

2 Claims. (Cl. 15—104.06)

This invention relates to an improved device for removing deposits from the interior of pipe, and, at the same time, straightening the pipe by pressing out dents and restoring the pipe to its original shape.

It is the object of the invention to provide a device of this character which may be passed through a pipe even though the pipe may not follow a straight course and sections of the pipe may be mashed or dented, by providing a reshaper or dent remover as a leading element and a cleaner as a follower, with means to permit limited universal movement between the parts so that the device may pass around a curve.

Another object of the invention is to provide such a device in which novel means are employed to permit the necessary universal movement between the parts without disturbing the axial alignment of the shaft connecting the parts.

It is a further object to provide, in a device of this character, expander means to ensure pressure contact between the cleaner and the pipe so that all points on the interior of the pipe will be thoroughly cleaned.

Other objects will become apparent from the following detailed description of a preferred and practical embodiment of the invention, and from the drawing which accompanies and forms a part of this specification.

In the drawing, throughout the several figures of which the same characters of reference are used to denote identical parts:

Figure 1 is an elevational view of a device embodying the principles of the present invention, the cleaner and reshaper being shown in position within a pipe, the pipe being shown in section;

Figure 2 is a vertical sectional view of the device;

Figure 3 is a transverse section taken on the line 3—3 of Figure 2; and

Figure 4 is a view in elevation of a brush which may be used in conjunction with the device.

Referring to the drawing in detail, the present invention comprises a reshaper or dent remover and cleaner indicated generally by the numeral 1, and a second cleaner 2, mounted upon the opposite ends of a shaft 3. Shaft 3 has a cylindrical, central, hub portion 4 of larger diameter than the end sections 5 and 6 which serves as a spacer to position the elements 1 and 2 upon the shaft. The shaft terminates in threaded studs 7 and 8 of less diameter than the end sections 5 and 6.

The reshaper and cleaner 1 comprises a steel backing plate 9, rubber cup washer 10 and die member 11. The backing plate 9 is slightly smaller than the interior of the pipe and is centrally apertured as at 12 to loosely fit over the end section 5 of the shaft and permit play between the shaft and backing plate. An annular peripheral recess 13 affords a seat on the backing plate for a coil spring 14 which extends completely around the recess and in its expanded state is larger than the peripheral seat of the recess. Backing plate 9 is provided with a boss 15 on its face adjacent the recess, over which is fitted the rubber cup washer 10. The flange 16 of the cup washer extends back over the backing plate 9, and spring 14 bears uniformly against the underside of the flange exerting an outward pressure. Die member 11 is in the form of a disk of such size and shape as to fit the interior of the pipe with just sufficient clearance to permit the die to freely slip through the pipe, where the pipe is of correct shape, and to press out any indented or mashed places in the pipe. The die is beveled on its leading edge to form a conic entering section to wedgingly press out depressions in the pipe. In assembling the unit 1, the backing plate 9 is first slipped over the shaft end section 5. The inner end of the bore 12 in the backing plate is reamed to form a partial ball seat 17 for the end of the shaft hub section 4 which is correspondingly rounded as at 18. This forms a ball and socket mounting for the backing plate permitting limited universal tilting of the plate with respect to the shaft within the limits of the loose-fitting bore around the shaft. Either before or after the backing plate is slipped upon the shaft, the spring 14 is placed in the recess 13 and the cup washer is placed in position on the boss 15. Die member 11 is then slipped on the shaft and the assembled parts held in position by a nut 19 threaded onto the stud 7. The length of the shaft end section is such that when the nut 19 is tight against the end of the end section the parts of the unit 1 will have sufficient room to tilt upon the shaft without binding between the nut and the hub 4.

The cleaner 2 is composed of a backing plate 20, similar to backing plate 9 with the exception that the bore 21 closely fits the shaft end section 6 and the bore is not reamed as is the bore of backing plate 9, and a rubber cup washer 22 and a retainer disk 23. The cup washer 22 is identical to the washer 10 and its flange 24 is pressed outward by a coil spring 25 fitting in a recess 26 in the backing plate 20. Backing plate 20 is provided with a boss 27 to receive and support the cup washer 22. Retaining disk 23 is of less diameter than die member 11 and serves only to hold the cup washer in position on the backing plate. In assembling the cleaner 2, the retainer disk is first slipped on the shaft and the backing plate with the cup washer and spring in position is then placed on the shaft and the entire unit clamped in place by the nut 28.

In use, the device is placed in a pipe, the die member 11 entering first, and forced through and out of the other end of the pipe by means of water pressure or compressed air. The die member reshapes the pipe and the cup washers, forced against the interior wall of the pipe by the springs 14 and 25, remove deposits from the wall and carry the debris ahead of them and out of the end of the pipe. The fluid pressure actuating medium pressing against and under the flange of the cup washer 22 will assist in maintaining the lip of the washer firmly against the interior wall of the pipe to better clean the pipe and prevent any loosened deposits from escaping past the washer and being left in the pipe. It will be noted that the spherical curvature of the shoulder 18 is struck from a center portion within the enlarged central portion of the shaft completely outside of the unit 1. To move about the ball joint, the unit 1 must move either up or down. The confinement of the pipes precludes this possibility. Only when the pipe walls curve upwardly or downwardly as at a bend may the unit tilt.

By reason of the ball and socket joint between the shaft and the unit 1, the reshaper and cleaner unit 1 may tilt to permit the device to pass around elbows or other normal bends in the pipe. The particular structural arrangement employed to permit the tilting maintains the entire device more rigid in passing through straight sections of pipe than would be the case if the shaft was jointed to provide the universal freedom of motion necessary for all conditions of use.

Although the device is shown equipped with a die member, in instances where the pipe needs no straightening the die may be removed and the circular wire brush member shown in Figure 4 substituted. The brush comprises a ring of wire bristles 29 secured to the periphery of a disk 30 having an opening 31 by means of which it may be slipped on the shaft. Opening 31 is oversize as is the opening in the die member to assist in the tilting of the unit. The brush will sweep all deposits from the interior of the pipe and the cup washers will push the loosened debris through the pipe.

While I have in the above described what I believe to be a preferred and practical embodiment of the invention it is to be understood that those skilled in the art to which the invention appertains may make obvious changes in the precise structure shown without departing from the spirit of the invention as defined in the appended claims.

Although this device is intended for use in cleaning and straightening pipe, it can readily be seen that it may be used as a separator in a pipe line to separate various types and grades of oils or liquids. When used in this manner the die member 11 will be removed and a plate similar to plate 23 substituted. When all of one type of fluid has entered the pipe, one of these units may be slipped in and forced through the pipe by a column of fluid of a different type which is pumped in behind it. This will prevent the different fluids from becoming mixed.

What I claim as my invention is:

1. A pipe cleaning device comprising a pair of cleaning units, a shaft having portions of reduced diameter thereby providing shoulders at the junctions of said reduced portions with the main portion, said cleaning units being mounted on said shaft in spaced relation positioned by said shoulders, one of said shoulders having a spherical curvature, one of said units having a bore of greater diameter than the adjacent reduced portion of the shaft, said bore being expanded at one end to form a spherical seat for said spherically curved shoulder on the shaft, whereby said unit seated on said spherical shoulder may assume small angular positions relative to the axis of said shaft to permit the device to follow a pipe which is curved along its axis.

2. In a pipe cleaning device, a shaft having an enlarged central portion terminating in shoulders at each end of said portion adjacent the extended end portions, one of said shoulders having its face perpendicular to the axis of the shaft and the other having a spherical curvature, a pair of plungers at least one of which supports a cleaner mounted on the extended end portions of said shaft, one of said plungers having a bore to fit the end portion of the shaft to permit the face of said plunger to bear rigidly against said perpendicular face on said shaft, the other said plunger having an enlarged bore to loosely surround the other end portion of the shaft, the enlarged bore having its end expanded to form a spherical seat for said spherical shoulder, the arcs of both the shoulder and the bore being struck from a point within the enlarged central portion of the shaft between the inner vertical planes of said plungers, and means to frictionally hold the said plungers against said shoulders.

JOSEPH R. WOOD.